(12) United States Patent
Kim et al.

(10) Patent No.: US 10,770,075 B2
(45) Date of Patent: Sep. 8, 2020

(54) METHOD AND APPARATUS FOR ACTIVATING APPLICATION BY SPEECH INPUT

(71) Applicant: QUALCOMM Incorporated, San Diego, CA (US)

(72) Inventors: Taesu Kim, Seongnam (KR); Minsub Lee, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 14/257,814

(22) Filed: Apr. 21, 2014

(65) Prior Publication Data

US 2015/0302855 A1    Oct. 22, 2015

(51) Int. Cl.
*G10L 15/08*      (2006.01)
*G10L 15/22*      (2006.01)
*G10L 17/22*      (2013.01)

(52) U.S. Cl.
CPC .............. *G10L 17/22* (2013.01); *G10L 15/08* (2013.01); *G10L 15/22* (2013.01); *G10L 2015/223* (2013.01)

(58) Field of Classification Search
CPC ...................................................... G10L 15/22
USPC ........................................................ 704/275
See application file for complete search history.

(56) References Cited

U.S. PATENT DOCUMENTS

| 5,873,064 | A | 2/1999 | De Armas et al. | |
| 8,510,117 | B2 * | 8/2013 | Agapi | G10L 15/26 |
| | | | | 704/275 |
| 9,240,182 | B2 * | 1/2016 | Lee | G10L 15/20 |
| 2002/0118220 | A1 * | 8/2002 | Lui | G06F 9/453 |
| | | | | 715/709 |
| 2003/0163310 | A1 | 8/2003 | Caldwell et al. | |
| 2007/0088556 | A1 * | 4/2007 | Andrew | G10L 15/19 |
| | | | | 704/270.1 |

(Continued)

FOREIGN PATENT DOCUMENTS

| CN | 1819016 A | 8/2006 |
| EP | 1562180 A1 | 8/2005 |

(Continued)

OTHER PUBLICATIONS

International Search Report and Written Opinion—PCT/US2015/024155—ISP/EPO—dated Jul. 20, 2015, 11 pages.

*Primary Examiner* — Huyen X Vo
*Assistant Examiner* — Timothy Nguyen
(74) *Attorney, Agent, or Firm* — Moore Intellectual Property Law, PLLC

(57) ABSTRACT

A method, which is performed in an electronic device, for activating a target application is disclosed. The method may include receiving an input sound stream including an activation keyword for activating the target application and a speech command indicative of a function of the target application. The method may also detect the activation keyword from the input sound stream. If the activation keyword is detected, a portion of the input sound stream including at least a portion of the speech command may be buffered in a buffer memory. In addition, in response to detecting the activation keyword, the target application may be activated to perform the function of the target application.

43 Claims, 13 Drawing Sheets

(56) References Cited

U.S. PATENT DOCUMENTS

| | | | | |
|---|---|---|---|---|
| 2007/0118380 | A1* | 5/2007 | Konig | B60R 16/0373 |
| | | | | 704/270 |
| 2010/0088094 | A1 | 4/2010 | Wang | |
| 2010/0105364 | A1 | 4/2010 | Yang | |
| 2011/0010180 | A1* | 1/2011 | Agapi | G10L 15/26 |
| | | | | 704/275 |
| 2011/0119062 | A1* | 5/2011 | Dohan | B60Q 1/34 |
| | | | | 704/275 |
| 2014/0101608 | A1* | 4/2014 | Ryskamp | G06F 3/0482 |
| | | | | 715/810 |
| 2014/0222436 | A1* | 8/2014 | Binder | G10L 15/265 |
| | | | | 704/275 |
| 2014/0257821 | A1* | 9/2014 | Adams | G10L 25/93 |
| | | | | 704/275 |
| 2014/0282007 | A1* | 9/2014 | Fleizach | G06F 3/0487 |
| | | | | 715/728 |
| 2014/0337031 | A1* | 11/2014 | Kim | G06F 3/167 |
| | | | | 704/256.5 |
| 2015/0012279 | A1* | 1/2015 | Kim | G10L 25/48 |
| | | | | 704/275 |
| 2015/0040012 | A1* | 2/2015 | Faaborg | G10L 15/22 |
| | | | | 715/728 |
| 2015/0106085 | A1* | 4/2015 | Lindahl | G10L 15/32 |
| | | | | 704/231 |
| 2015/0106096 | A1* | 4/2015 | Toopran | G10L 15/193 |
| | | | | 704/244 |
| 2015/0161989 | A1* | 6/2015 | Hsu | G10L 15/08 |
| | | | | 704/251 |
| 2018/0365567 | A1* | 12/2018 | Kolavennu | G06N 5/022 |

FOREIGN PATENT DOCUMENTS

| | | |
|---|---|---|
| EP | 2337024 A1 | 6/2011 |
| EP | 2610862 A1 | 7/2013 |
| EP | 2669889 A2 | 12/2013 |
| JP | H03200298 A | 9/1991 |
| JP | H04177400 A | 6/1992 |
| JP | 2006215499 A | 8/2006 |
| JP | 2009175179 A | 8/2009 |
| WO | 0146946 A1 | 6/2001 |
| WO | 2012025784 A1 | 3/2012 |

* cited by examiner

METHOD AND APPARATUS FOR ACTIVATING APPLICATION BY SPEECH INPUT

TECHNICAL FIELD

The present disclosure relates generally to activating an application in an electronic device, and more specifically, to activating an application in an electronic device for performing a function by storing speech input.

BACKGROUND

Recently, the use of electronic devices such as smartphones, tablet computers, and wearable computers has been increasing among consumers. These devices may provide a variety of capabilities such as data processing and communication, voice communication, Internet browser, multimedia player, game player, etc. In addition, such electronic devices may include a variety of applications capable of performing various functions for users.

For user convenience, conventional electronic devices often include a speech recognition function to recognize speech from users. In such electronic devices, a user may speak a voice command for performing a specified function instead of manually navigating through an I/O device such as a touch screen or a keyboard. The voice command from the user may then be recognized and the specified function may be performed in the electronic devices.

In conventional electronic devices equipped with a speech recognition function, a user typically speaks a predetermined keyword to initiate a speech processing application that can recognize a subsequent voice command and perform a function associated with the voice command. For example, the user may speak the predetermined keyword to initiate the speech processing application and wait for the application to be loaded. After the application has been loaded, the user may speak a voice command specifying a function of the application (e.g., an Internet search) to be performed. Since the time needed to recognize the keyword and load the application leads to a delay in speaking the voice command by the user, using a keyword and a voice command in tandem to perform a function in an electronic device may not be very convenient to the user.

In some cases, an electronic device equipped with a speech recognition function may initiate an application accidentally. For example, a user may speak a keyword as part of a conversation or discussion with another person without intending to initiate an associated application. Nevertheless, the electronic device may recognize the keyword spoken by the user and initiate the application. Thus, the user may need to manually terminate the application, thereby resulting in user inconvenience. On the other hand, if the user does not notice the initiation of the application, the application may continue to run on the electronic device.

SUMMARY

The present disclosure provides methods and apparatus for activating a target application in response to detecting an activation keyword to perform a function of the target application that is associated with a speech command.

According to one aspect of the present disclosure, a method, which is performed in an electronic device, for activating a target application is disclosed. The method may include receiving an input sound stream including an activation keyword for activating the target application and a speech command indicative of a function of the target application. The method may also detect the activation keyword from the input sound stream. If the activation keyword is detected, a portion of the input sound stream including at least a portion of the speech command may be buffered in a buffer memory. In addition, in response to detecting the activation keyword, the target application may be activated to perform the function of the target application. This disclosure also describes apparatus, a device, a system, a combination of means, and a computer-readable medium relating to this method.

According to another aspect of the present disclosure, an electronic device for activating a target application is disclosed. The electronic device may include a sound sensor configured to receive an input sound stream including an activation keyword for activating the target application and a speech command indicative of a function of the target application. The electronic device may also include a voice activation unit configured to detect the activation keyword from the input sound stream and activate the target application in response to detecting the activation keyword to perform the function of the target application. A buffer memory in the electronic device may be configured to store a portion of the input sound stream including at least a portion of the speech command if the activation keyword is detected.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
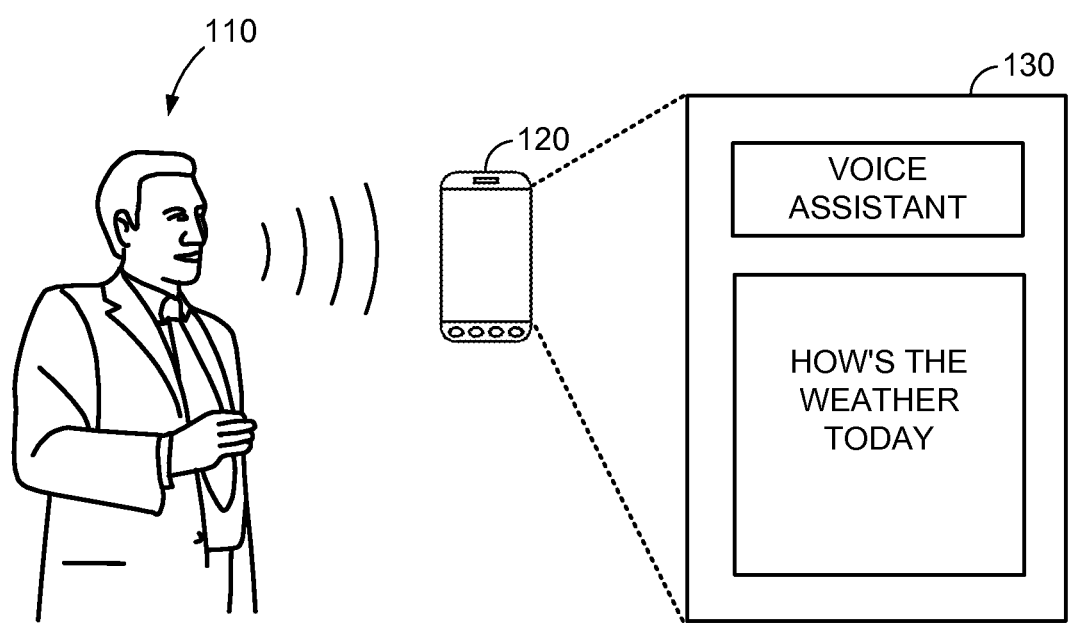
FIG. 1 illustrates a mobile device that activates a voice assistant application in response to an activation keyword in an input sound stream, according to one embodiment of the present disclosure.

FIG. 1 illustrates a mobile device 120 that activates a voice assistant application 130 in response to an activation keyword in an input sound stream, according to one embodiment of the present disclosure. Initially, the mobile device 120 may store an activation keyword for activating an application such as the voice assistant application 130 in the mobile device 120. In the illustrated embodiment, when a user 110 speaks the activation keyword such as "START VOICE ASSISTANT" to the mobile device 120, the mobile device 120 may capture an input sound stream and detect the activation keyword in the input sound stream. As used herein, the term "sound stream" may refer to a sequence of one or more sound signals or sound data, and may include analog, digital, and acoustic signals or data.

Upon detecting the activation keyword, the mobile device 120 may buffer a portion of the input sound stream in a buffer memory of the mobile device 120. For example, the user 110 may speak a speech command associated with a function of the voice assistant application 130. The voice assistant application 130 may be configured to perform any suitable number of functions such as performing a search on the Internet, setting alarms, managing schedules, and the like, each of which may be associated with a speech command In the illustrated embodiment, the user 110 speaks "HOW'S THE WEATHER TODAY" as a speech command, and at least a portion of the speech command in the input sound stream may be buffered in the buffer memory.

Once the portion of the input sound stream including at least a portion of the speech command is buffered, the mobile device 120 may verify whether to activate the voice assistant application 130 based on the buffered portion of the input sound stream, as will be described below in more detail with reference to FIG. 4. For example, the mobile device 120 may verify whether to activate the voice assistant application 130 based on speech characteristics and/or a signal-to-noise ratio (SNR) of the buffered portion of the input sound stream. If activation of the voice assistant application 130 is not verified based on the buffered portion of the input sound stream, the mobile device 120 may proceed to receive a next input sound stream for detecting the activation keyword.

On the other hand, if activation of the voice assistant application 130 is verified, the mobile device 120 may activate the voice assistant application 130 to recognize the speech command in the buffered portion of the input sound stream. In the illustrated embodiment, the voice assistant application 130 may recognize the speech command "HOW'S THE WEATHER TODAY" from the buffered portion of the input sound stream. Upon recognizing the speech command, the voice assistant application 130 may perform a search function for the weather over the Internet and display weather information for the user 110. In some embodiments, the mobile device 120 may store a plurality of activation keywords for use in detecting the activation keywords from an input sound of a user. In this case, each of the activation keywords may be configured to activate an application associated with the activation keyword in the mobile device 120.

Figure 2:
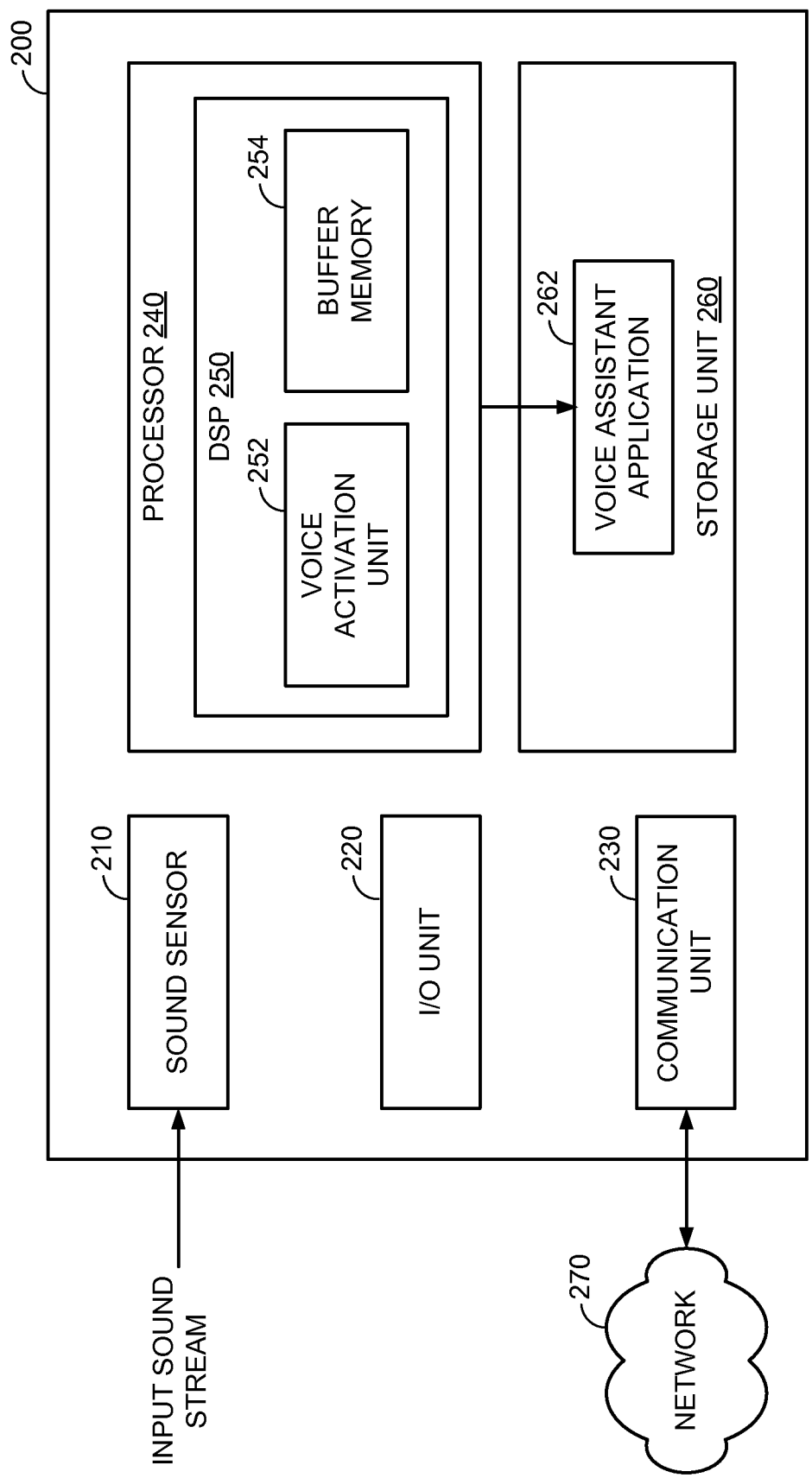
FIG. 2 illustrates a block diagram of an electronic device configured to activate a voice assistant application by buffering a portion of an input sound stream including a speech command upon detecting an activation keyword in the input sound stream, according to one embodiment of the present disclosure.

FIG. 2 illustrates a block diagram of an electronic device 200 configured to activate a voice assistant application 262 by buffering a portion of an input sound stream including a speech command upon detecting an activation keyword in the input sound stream, according to one embodiment of the present disclosure. As used herein, the term "activation keyword" may refer to one or more words or sound uttered from a speaker indicative of the voice assistant application 262 for performing a function in the mobile device 120, and the term "speech command" may refer to one or more words or sound uttered from a speaker indicative of a function that may be performed by the voice assistant application 262. The electronic device 200 may include a sound sensor 210, an I/O (input/output) unit 220, a communication unit 230, a processor 240, and a storage unit 260. The electronic device 200 may be any suitable device equipped with sound capturing and processing capabilities such as a cellular phone, a smartphone (e.g., the mobile device 120), a personal computer, a laptop computer, a tablet computer, a smart television, a gaming device, a multimedia player, smart glasses, a wearable computer, etc.

The processor 240 may be an application processor (AP), a central processing unit (CPU), or a microprocessor unit (MPU) for managing and operating the electronic device 200 and may include a digital signal processor (DSP) 250. The DSP 250 may include a voice activation unit 252 and a buffer memory 254. In one embodiment, the DSP 250 may be a low power processor for reducing power consumption in processing sound streams. In this configuration, the voice activation unit 252 in the DSP 250 may be configured to activate the voice assistant application 262, which is stored in the storage unit 260, in response to an activation keyword in an input sound stream. According to one embodiment, the voice activation unit 252 may activate the processor 240, which in turn may activate the voice assistant application 262 (as indicated with an arrow in FIG. 2) by loading and launching the voice assistant application 262. Although the voice activation unit 252 is configured to activate the voice assistant application 262 in the illustrated embodiment, it may also activate any function or application of the electronic device 200 that may be associated with an activation keyword.

The sound sensor 210 may be configured to receive an input sound stream and provide the received input sound stream to the DSP 250. The sound sensor 210 may include one or more microphones or other types of sound sensors that can be used to receive, capture, sense, and/or detect sound. In addition, the sound sensor 210 may employ any suitable software and/or hardware for performing such functions.

For reducing power consumption, the sound sensor 210 may be configured to receive the input sound stream periodically according to a duty cycle. For example, the sound sensor 210 may operate on a 10% duty cycle such that the input sound stream is received 10% of the time (e.g., 20 ms in a 200 ms period). In this case, the sound sensor 210 may detect sound by determining whether the received portion of the input sound stream exceeds a predetermined threshold sound intensity. For example, a sound intensity of the received portion of the input sound stream may be determined and compared with the predetermined threshold sound intensity. If the sound intensity of the received portion exceeds the threshold sound intensity, the sound sensor 210 may disable the duty cycle function to continue receiving a remaining portion of the input sound stream. In addition, the sound sensor 210 may activate the DSP 250 and provide the received portion of the input sound stream including the remaining portion to the DSP 250.

When the DSP 250 is activated by the sound sensor 210, the voice activation unit 252 may be configured to continuously receive the input sound stream from the sound sensor 210 and detect an activation keyword (e.g., "START VOICE ASSISTANT") in the received input sound stream for activating the voice assistant application 262. For detecting the activation keyword, the voice activation unit 252 may employ any suitable keyword detection methods based on a Markov chain model such as a hidden Markov model (HMM), a semi-Markov model (SMM), or a combination thereof.

In one embodiment, the storage unit 260 may store a plurality of words for one or more activation keywords and speech commands that may be used to activate the voice assistant application 262 and perform a function of the voice assistant application 262. Additionally, the storage unit 260 may store state information on a plurality of states associated with a plurality of portions of the words. According to one embodiment, each of the words for the activation keywords and speech commands may be divided into a plurality of basic units of sound such as phones, phonemes, or subunits thereof, and a plurality of portions of each of the words may be generated based on the basic units of sound. Each portion of each of the words may then be associated with a state under a Markov chain model such as an HMM, an SMM, or a combination thereof.

The storage unit 260 may also store the voice assistant application 262 that can be accessed by the processor 240. Although the storage unit 260 stores the voice assistant application 262 in the illustrated embodiment, it may also store any other applications or functions of the electronic device 200 that can be executed by the processor 240. The storage unit 260 may be implemented using any suitable storage or memory devices such as a RAM (Random Access Memory), a ROM (Read-Only Memory), an EEPROM (Electrically Erasable Programmable Read-Only Memory), a flash memory, or an SSD (Solid State Drive).

Upon detecting the activation keyword, the voice activation unit 252 may be configured to buffer (or temporarily store) a portion of the input sound stream received from the sound sensor 210 in the buffer memory 254 of the DSP 250. The buffer memory 254 may be implemented using any suitable storage or memory schemes in a processor such as a local memory or a cache memory. Although the DSP 250 includes the buffer memory 254 in the illustrated embodiment, the buffer memory 254 may be implemented as a memory area in the storage unit 260. In some embodiments, the buffer memory 254 may be implemented using a plurality of physical memory areas or a plurality of logical memory areas.

As the portion of the input sound stream is received from the sound sensor 210, the voice activation unit 252 may buffer at least a portion of the speech command in the buffer memory 254. For example, the buffered portion may include all or most of the speech command indicative of a function of the voice assistant application 262 (e.g., "HOW'S THE WEATHER TODAY"). In some embodiments, the received portion of the input sound stream may continue to be buffered in the buffer memory 254 until an end of the speech command is detected.

Accessing the buffered portion of the input sound stream in the buffer memory 254, the voice activation unit 252 may verify whether to activate the voice assistant application 262 in response to detecting the activation keyword. For example, the voice assistant application 262 may verify whether to activate the voice assistant application 262 based on sound characteristics of the buffered portion of the input sound stream. If activation of the voice assistant application 262 is verified, the voice activation unit 252 may activate the processor 240, which in turn may activate the voice assistant application 262 by accessing the storage unit 260.

Once the voice assistant application 262 is activated by the voice activation unit 252, the voice assistant application 262 may perform a voice assistant function by recognizing the speech command using any suitable speech recognition methods based on an HMM, an SMM, or the like. In one embodiment, the voice assistant application 262 may recognize the speech command from the buffered portion of the input sound stream that is stored in the buffer memory 254. In some embodiments, the buffered portion of the input sound stream may be copied from the buffer memory 254 to the storage unit 260 or a local memory (not shown) in the processor 240, which may be accessed by the activated voice assistant application 262 for recognizing the speech command.

Upon recognizing the speech command from the buffered portion of the input sound stream, the voice assistant application 262 may perform a function associated with the recognized speech command. For example, when a speech command for an Internet search is received, the voice assistant application 262 may perform a web search via the communication unit 230 through the network 270. In this case, search results for the speech command may be output on a display screen of the I/O unit 220.

Figure 3:
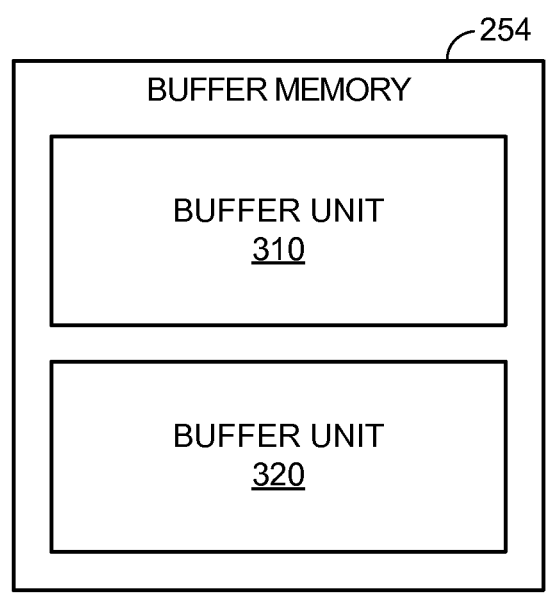
FIG. 3 illustrates a detailed block diagram of a buffer memory in the electronic device including a plurality of buffer units for buffering an input sound stream, according to one embodiment of the present disclosure.

FIG. 3 illustrates a detailed block diagram of the buffer memory 254 including a plurality of buffer units 310 and 320 for buffering an input sound stream, according to one embodiment of the present disclosure. The buffer units 310 and 320 may be implemented as physical or logical memory blocks in the buffer memory 254. Although the buffer memory 254 includes the two buffer units 310 and 320 in the illustrated embodiment, the buffer memory 254 may include any suitable number of buffer units.

If the buffer units 310 and 320 are implemented with logical memory blocks, the buffer units 310 and 320 may share a predetermined memory address range of a physical memory in which any suitable information or data (e.g., a portion of a received input sound stream) for the buffer units 310 and 320 may be buffered (or stored). In this case, a plurality of pointers may be allocated to refer to a plurality of addresses or locations of data, respectively, in the memory address range. A pointer may be allocated for referring to the information or data buffered for the buffer unit 310 while a different pointer may be allocated for referring to the information or data buffered for the buffer unit 320. Alternatively, a same memory address may be allocated for referring to different data stored in the buffer units 310 and 320 and a predetermined data management operation may be performed to store, maintain, access, and/or retrieve the data for each of the buffer units 310 and 320.

As an input sound stream is received, the sound sensor 210 may provide the input sound stream to the DSP 250, which may start buffering the input sound stream in the buffer unit 310. The buffer unit 310 may be configured to buffer (or temporarily store) the input sound stream including at least a portion of an activation keyword for use in detecting the activation keyword. From the buffered portion of the input sound stream in the buffer unit 310, the voice activation unit 252 may detect the activation keyword. Upon detecting the activation keyword, the DSP 250 may stop buffering the input sound stream in the buffer unit 310.

When the activation keyword is detected, the DSP 250 may continue to receive the input sound stream from the sound sensor 210 and start buffering the input sound stream in the buffer unit 320. In one embodiment, the DSP 250 may receive and buffer (or temporarily store) a portion of the input sound stream in the buffer unit 320 that may include at least a portion of a speech command. As the input sound stream is buffered in the buffer unit 320, the voice activation unit 252 may access the buffered portion of the input sound stream in the buffer unit 320 and verify whether to activate the voice assistant application 262 based on the buffered portion.

Figure 4:
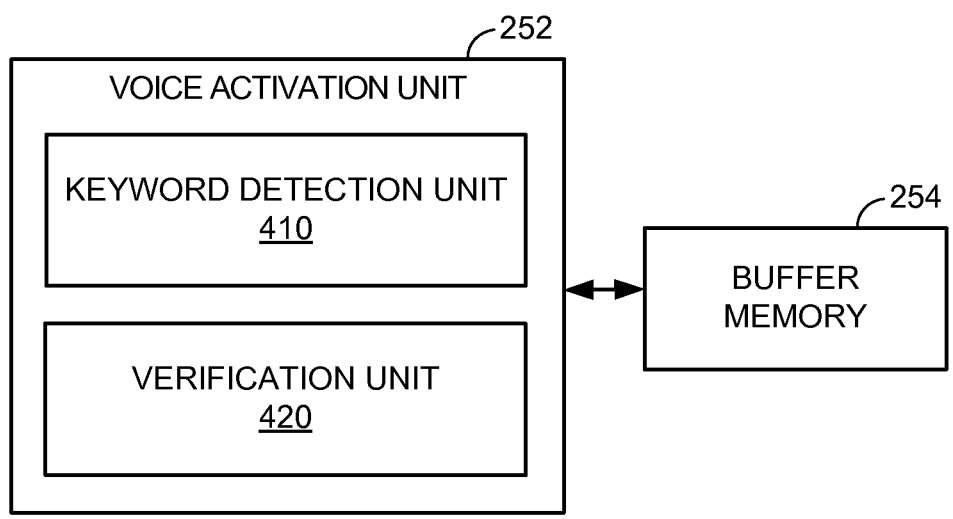
FIG. 4 illustrates a detailed block diagram of a voice activation unit in the electronic device that is configured to verify whether to activate the voice assistant application based on a buffered portion of an input sound stream, according to one embodiment of the present disclosure.

FIG. 4 illustrates a detailed block diagram of the voice activation unit 252 of the electronic device 200 that is configured to verify whether to activate the voice assistant application 262 based on a buffered portion of an input sound stream, according to one embodiment of the present disclosure. The voice activation unit 252 may include a keyword detection unit 410 and a verification unit 420. As shown, the voice activation unit 252 may receive an input sound stream from the sound sensor 210 for detecting an activation keyword and verifying whether to activate the voice assistant application 262. The buffer memory 254 may buffer at least a portion of the input sound stream for use in detecting the activation keyword and verifying whether to activate the voice assistant application 262. In one embodiment, the buffer memory 254 may include the buffer units 310 and 320 for buffering at least a portion of the activation keyword and at least a portion of a speech command, respectively, as described above with reference to FIG. 3.

As the input sound stream is received and buffered in the buffer memory 254, the keyword detection unit 410 in the voice activation unit 252 may access the buffer memory 254 and detect an activation keyword from the buffered portion of the input sound stream by using any suitable keyword detection methods based on an HMM, an SMM, or the like. In some embodiments, as the input sound stream is received and buffered, the keyword detection unit 410 may determine a plurality of keyword scores for the buffered portion of the input sound stream by using any suitable probability models such as a Gaussian mixture model (GMM), a neural network, a support vector machine (SVM), and the like. The keyword detection unit 410 may compare each of the keyword scores with a predetermined detection threshold score and when one of the keyword scores exceeds the detection threshold score, the activation keyword may be detected from the buffered portion of the input sound stream.

Upon detecting the activation keyword, the DSP 250 may continue to receive the input sound stream from the sound sensor 210 and start buffering the received input sound stream in the buffer memory 254. In this case, the portion of the input sound stream that is buffered in the buffer memory 254 may include at least a portion of the speech command from a user of the electronic device 200. In some embodiments, the DSP 250 may detect an end of the speech command from the buffered portion of the speech command and terminate buffering the input sound stream in the buffer memory 254. The end of the speech command may be detected by using any suitable voice activity detection (VAD) methods. According to one embodiment, the end of the speech command may be detected by analyzing a sound intensity of the buffered portion of the input sound stream. For example, when the sound intensity decreases below a predetermined intensity value, the end of the speech command may be detected. Additionally or alternatively, the end of the speech command may be detected when a rapid decrease in sound intensity (e.g., an edge in change of sound intensity) is detected. Upon detecting the end of the speech command, the DSP 250 may instruct the verification unit 420 in the voice activation unit 252 to verify whether to activate the voice assistant application 262.

When the end of the speech command is detected, the verification unit 420 may access the portion of the input sound stream including at least a portion of the speech command buffered in the buffer memory 254 and verify whether to activate the voice assistant application 262 based on the buffered portion. In one embodiment, the verification unit 420 may determine whether the buffered portion of the input sound stream includes speech by using any suitable sound classification methods such as a GMM-based classifier, a neural network, an HMM, a graphical model, an SVM technique, and the like. If it is determined that the buffered portion of the input sound stream includes speech, the verification unit 420 may verify activation of the voice assistant application 262.

In one embodiment, the verification unit 420 may further determine whether the speech in the buffered portion of the input sound stream is indicative of a speaker of the activation keyword. In this case, sound characteristics such as sound features and/or audio fingerprints may be extracted from the activation keyword and the speech in the buffered portions of the input sound stream. The sound characteristics from the activation keyword may then be compared with the sound characteristics from the speech command, and activation of the voice assistant application 262 may be verified if the sound characteristics are determined to be the same or similar.

In another embodiment, the verification unit 420 may determine a signal-to-noise ratio (SNR) of the buffered portion of the input sound stream including the portion of the speech command. In this case, when the SNR of the buffered portion is determined to be greater than a predetermined threshold SNR, the verification unit 420 may verify activation of the voice assistant application 262. In the above embodiments, the verification unit 420 may access the buffer memory 254 for verifying whether to activate the voice assistant application 262 before or after the end of the speech command is detected.

According to some embodiments, the speech command may include one or more predetermined words indicative of revoking the activation keyword (e.g., "CANCEL," "NEVER MIND," and "FORGET IT"). For example, a person or a user near the electronic device 200 may accidentally or unintentionally speak an activation keyword (e.g., "START VOICE ASSISTANT") and the person or the user near the electronic device 200 may revoke the activation keyword by speaking such predetermined words to avoid activation of the voice assistant application 262. The one or more revocation words may also be referred to as a revocation command. As an input sound stream including the one or more revocation words is received and buffered in the buffer memory 254, the verification unit 420 may access the buffered input sound stream including the revocation words and determine whether the buffered input sound stream includes such predetermined words. If it is determined that the buffered input sound stream includes any of the predetermined words indicative of revoking the activation keyword, the electronic device 200 may proceed to receive a next input sound stream for detecting the activation keyword without activating the voice assistant application 262. On the other hand, if it is determined that the buffered input sound stream does not include such revocation words, it may be inferred that the speaker or the user intentionally spoke the activation keyword and the verification unit 420 may verify activation of the voice assistant application 262.

Figure 5:
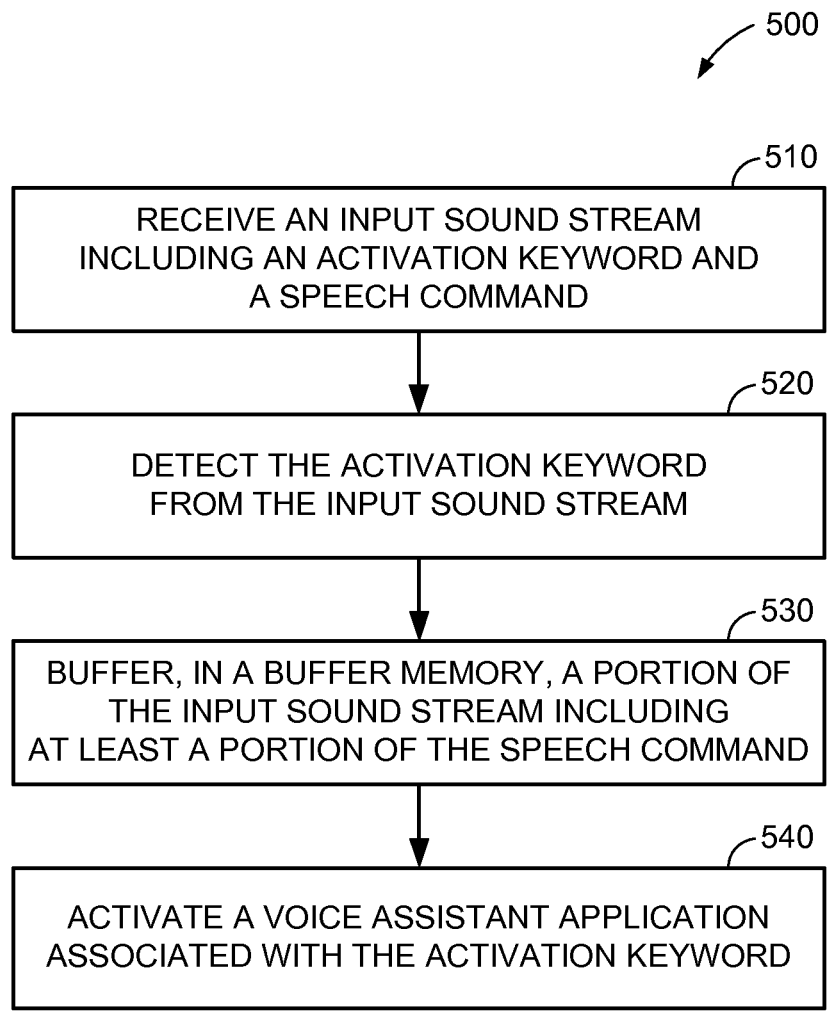
FIG. 5 illustrates a flowchart of a method for activating a voice assistant application by buffering a portion of an input sound stream including a speech command upon detecting an activation keyword in the input sound stream, according to one embodiment of the present disclosure.

FIG. 5 illustrates a flowchart of a method 500 for activating the voice assistant application 262 by buffering a portion of an input sound stream including a speech command upon detecting an activation keyword in the input sound stream, according to one embodiment of the present disclosure. The electronic device 200 may receive the input sound stream including the activation keyword for activating the voice assistant application 262 and the speech command indicative of a function of the voice assistant application 262, at 510. For example, the activation keyword may be "START VOICE ASSISTANT" and the speech command may be "HOW'S THE WEATHER TODAY."

In one embodiment, a portion of the received input sound stream including at least a portion of the activation keyword may be buffered in the buffer unit 310 of the buffer memory 254. The voice activation unit 252 in the DSP 250 of the electronic device 200 may detect the activation keyword from the portion of the input sound stream buffered in the buffer unit 310, at 520. If the activation keyword is detected, the electronic device 200 may buffer a portion of the input sound stream in the buffer unit 320 of the buffer memory 254, at 530. The portion of the input sound stream buffered in the buffer unit 320 may include at least a portion of the speech command.

The electronic device 200 may activate the voice assistant application 262 which is associated with the activation keyword, at 540. According to one embodiment, the voice activation unit 252 may verify whether to activate the voice assistant application 262 based on the portion of the input sound stream buffered in the buffer unit 320. In this embodiment, the voice activation unit 252 may activate the voice assistant application 262 when activation of the voice assistant application 262 is verified. Once the voice assistant application 262 is activated, the portion of the input sound stream buffered in the buffer unit 320 may be accessed by the voice assistant application 262 for recognizing the speech command from the buffered portion and performing the function of the voice assistant application 262 associated with the recognized speech command.

Figure 6:
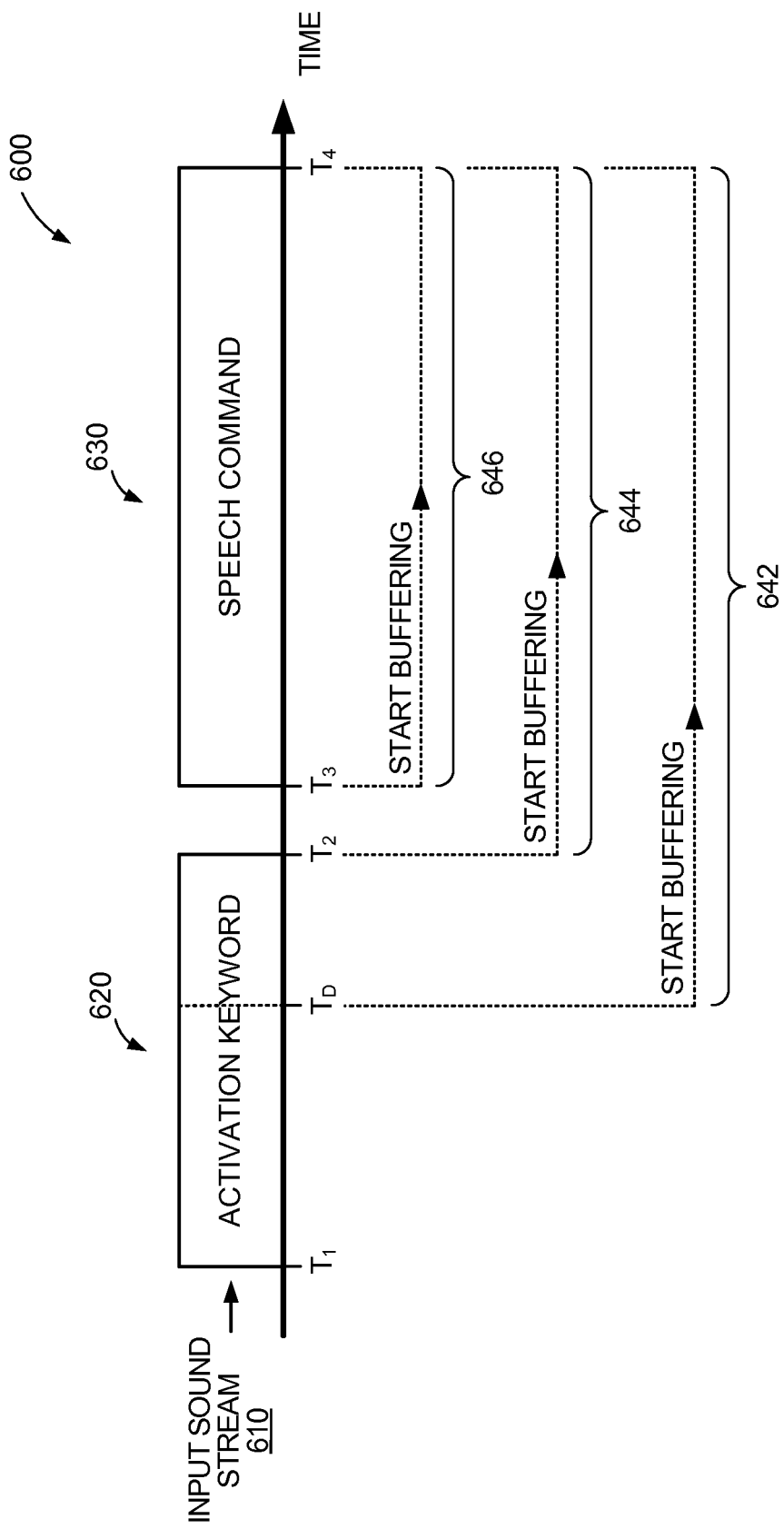
FIG. 6 is a timing diagram of buffering a portion of an input sound stream including a speech command when an activation keyword is detected in the input sound stream, according to one embodiment of the present disclosure.

FIG. 6 is a timing diagram 600 of buffering a portion 642, 644, or 646 of an input sound stream 610 including a speech command 630 when an activation keyword 620 is detected in the input sound stream 610, according to one embodiment of the present disclosure. As shown, the electronic device 200 may receive the input sound stream 610 including the activation keyword 620 and the speech command 630. In the timing diagram 600, the activation keyword 620 in the input sound stream 610 may be received from time $T_1$ to time $T_2$. Thus, time $T_1$ and time $T_2$ may correspond to a beginning and an end, respectively, of the activation keyword 620 in the input sound stream 610. Subsequently, the speech command 630 in the input sound stream 610 may be received from time $T_3$ to time $T_4$. In this case, time $T_3$ and time $T_4$ may correspond to a beginning and an end, respectively, of the speech command 630 in the input sound stream 610.

The input sound stream 610 may be received by the sound sensor 210 in the electronic device 200 and provided to the DSP 250 for detecting the activation keyword 620 and verifying whether to activate the voice assistant application 262. In one embodiment, the sound sensor 210 of the electronic device 200 may be configured to determine whether the input sound stream 610 includes sound exceeding a predetermined sound intensity based on a duty cycle. In this case, if the received input sound stream 610 is determined to include sound exceeding the predetermined sound intensity, the duty cycle function of the sound sensor 210 may be disabled (i.e., 100% duty cycle) so that the sound sensor 210 may continuously receive and provide the input sound stream 610 to the DSP 250.

As the input sound stream 610 is received from the sound sensor 210, the DSP 250 may buffer the received input sound stream 610 in the buffer unit 310 of the buffer memory 254 and detect the activation keyword 620 from the input sound stream 610 that is buffered in the buffer unit 310. As described above with reference to FIG. 4, the DSP 250 may detect the activation keyword 620 by determining a plurality of keyword scores for the buffered portion of the input sound stream 610 in the buffer unit 310 and comparing the keyword scores with a detection threshold score. In the timing diagram 600, the activation keyword 620 may be detected from the buffered portion of the input sound stream 610 at time $T_D$ before receiving the entire activation keyword 620 in the input sound stream 610. In other embodiments, the activation keyword 620 may be detected at time $T_2$ upon receiving the entire activation keyword 620 in the input sound stream 610.

When the activation keyword 620 is detected, the DSP 250 may start buffering the input sound stream 610 received from the sound sensor 210 in the buffer unit 320 of the buffer memory 254. In one embodiment, the DSP 250 may start buffering the input sound stream 610 in the buffer unit 320 upon detecting the activation keyword at time $T_D$. The DSP 250 may continue to buffer the input sound stream 610 in the buffer unit 320 until the end of the speech command 630 is detected at time $T_4$. As a result, the portion 642 of the input sound stream 610 may be buffered in the buffer unit 320 during a period from time $T_D$ to time $T_4$.

In another embodiment, the DSP 250 may start buffering the input sound stream 610 in the buffer unit 320 upon detecting the end of the voice activation keyword at time $T_2$.

For example, the DSP 250 may detect the end of the activation keyword 620 by determining a plurality of keyword scores for the buffered portion of the input sound stream 610 in the buffer unit 310 and comparing the keyword scores with an end threshold score, which will be described below in detail with reference to FIG. 7. In some embodiments, the voice activation unit 252 in the DSP 250 may be configured to detect the end of the activation keyword 620. The input sound stream 610 may be buffered until the end of the speech command 630 is detected at time $T_4$. Accordingly, the portion 644 of the input sound stream 610 may be buffered in the buffer unit 320 during a period from time $T_2$ to time $T_4$.

According to some embodiments, the DSP 250 may start buffering the input sound stream 610 in the buffer unit 320 upon detecting the beginning of the speech command 630 at time $T_3$. In this case, after detecting the end of the activation keyword 620 at time $T_2$, the DSP 250 may detect the beginning of the speech command 630 by using any suitable VAD methods. For example, after detecting the end of the activation keyword 620 at time $T_2$, the DSP 250 may buffer the input sound stream 610 being received after time $T_2$ in the buffer unit 310. As the input sound stream 610 is being buffered after time $T_2$, the DSP 250 may periodically or aperiodically determine a sound intensity of the buffered input sound stream 610 and compare the sound intensity with a predetermined threshold sound intensity. If the sound intensity exceeds the threshold sound intensity, the DSP 250 may detect the beginning of the speech command 630. Additionally or alternatively, the end of the speech command 630 may be detected when a rapid increase in sound intensity (e.g., an edge in change of sound intensity) is detected. For example, such an increase may be detected when a current sound intensity is greater than a previous sound intensity by more than a predetermined sound intensity. In some embodiments, the voice activation unit 252 in the DSP 250 may be configured to detect the beginning of the speech command 630. In the illustrated timing diagram 600, when the beginning of the speech command 630 is detected at time $T_3$, the DSP 250 may buffer the portion 646 of the input sound stream 610 in the buffer unit 320 during a period from time $T_3$ to time $T_4$.

Although the timing diagram 600 illustrates buffering the portion 642, 644, or 646 of the input sound stream 610 in the buffer unit 320 until the end of the speech command 630 is detected, the DSP 250 may terminate buffering the input sound stream 610 in the buffer unit 320 before the end of the speech command 630 is detected, as will be described below in more detail with reference to FIG. 8. Accordingly, the portion 642, 644, or 646 of the input sound stream 610 buffered in the buffer unit 320 may include at least a portion of the speech command 630. Once the portion 642, 644, or 646 of the input sound stream 610 is buffered in the buffer unit 320, the voice activation unit 252 may verify whether to activate the voice assistant application 262 based on the buffered portion 642, 644, or 646 of the input sound stream 610.

Figure 7:
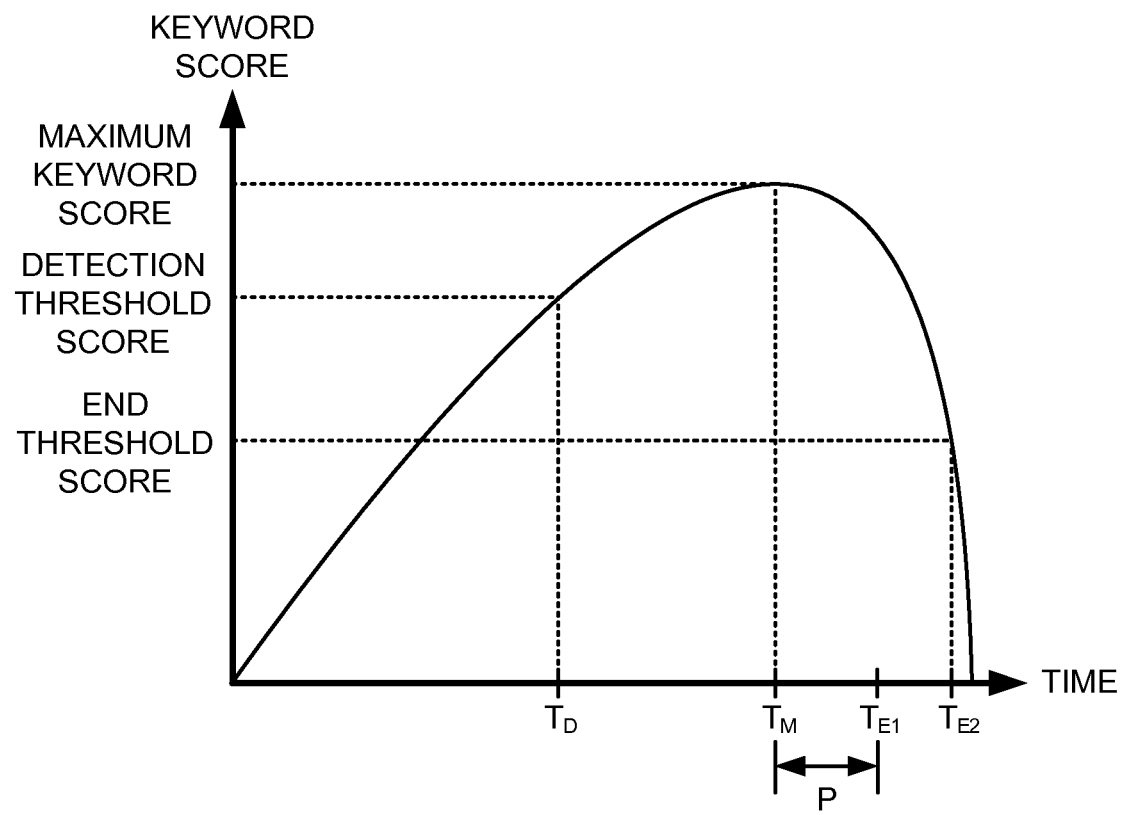
FIG. 7 is a graph illustrating change in a keyword score of an input sound stream that is determined for detecting an activation keyword from the input sound stream and an end of the activation keyword in the input sound stream, according to one embodiment of the present disclosure.

FIG. 7 is a graph illustrating change in a keyword score of an input sound stream that is determined for detecting an activation keyword from the input sound stream and an end of the activation keyword in the input sound stream, according to one embodiment of the present disclosure. The input sound stream may be received by the sound sensor 210 in the electronic device 200 and provided to the DSP 250. As the input sound stream is received from the sound sensor 210, the DSP 250 may buffer the received input sound stream in the buffer unit 310 of the buffer memory 254. For detecting the activation keyword from the input sound stream and the end of the activation keyword in the input sound stream, the keyword detection unit 410 in the voice activation unit 252 of the DSP 250 may periodically or aperiodically determine a plurality of keyword scores for the input sound stream buffered in the buffer unit 310.

In one embodiment, as the input sound stream is received and buffered, the keyword detection unit 410 may sequentially extract a plurality of sound features (e.g., audio fingerprints or MFCC (Mel-frequency cepstral coefficients) vectors) from the buffered input sound stream. In this case, a keyword score may be determined for one or more of the sound features by using any suitable keyword detection methods based on a Markov chain model such as an HMM, an SMM, or the like. As a more portion of the activation keyword in the input sound stream is received and buffered, the keyword score may increase, and may reach a maximum keyword score when a substantially entire portion of the activation keyword is received. In the example illustrated in FIG. 7, the keyword score reaches the maximum keyword score at time $T_M$ when a substantially entire portion of the activation keyword in the input sound stream is received and buffered, and decreases afterwards.

Each of the keyword scores may be compared with a predetermined detection threshold score. The keyword detection unit 410 may detect the activation keyword when at least one of the keyword scores exceeds the detection threshold score. The detection threshold score may indicate a score for ensuring detection of the activation keyword that is included in the input sound stream buffered in the buffer unit 310. In some embodiments, the detection threshold score may be set such that the activation keyword is detected when a portion of the activation keyword is included in the input sound stream. For example, while the activation keyword "START VOICE ASSISTANT" is being received, the keyword detection unit 410 may detect the activation keyword from a first portion of the activation keyword, e.g., "START VOICE ASSIS" that is buffered in the buffer unit 310. In other embodiments, the detection threshold score may be set such that the activation keyword score is detected when the entire activation keyword is included in the input sound stream, e.g., when an end of the activation keyword is received. In the example illustrated in FIG. 7, the detection threshold score is set such that the keyword detection unit 410 may detect the activation keyword at time $T_D$ when a first portion of the activation keyword is received and buffered.

In addition, the DSP 250 may detect an end of the activation keyword in the input sound stream. Upon detecting the end of the activation keyword, the DSP 250 may start buffering a portion of the input sound stream, which may include at least a portion of a speech command, in the buffer unit 320 of the buffer memory 254 as described above with reference to FIG. 6. In one embodiment, after detecting the activation keyword at time $T_D$, the DSP 250 may continue to buffer the input sound stream, which is received from the sound sensor 210, in the buffer unit 310 of the buffer memory 254. The DSP 250 may detect the end of the activation keyword based on one or more of keyword scores determined for the input sound stream buffered in the buffer unit 310.

In one embodiment, the DSP 250 may calculate a plurality of keyword scores based on sound features extracted from consecutive portions of the input sound stream buffered in the buffer unit 310. Also, the DSP 250 may determine a maximum keyword score among the plurality of keyword scores for detecting the end of the activation keyword. For example, the DSP 250 may determine the end of the activation keyword to be detected at a time when a predetermined period of time elapses from a time when a portion of the input sound stream corresponding to the maximum keyword score is received. In the example illustrated in FIG. 7, the DSP 250 may determine the end of the activation keyword to be detected at time $T_{E1}$, when a predetermined period of time P elapses since the maximum keyword score is calculated for a portion of the input sound stream received at time $T_M$.

In another embodiment, after determining the maximum keyword score, the DSP 250 may detect the end of the activation keyword by comparing the subsequently determined keyword scores with a predetermined end threshold score. In this case, the end of the activation keyword may be detected when one of the subsequently determined keyword scores is determined to be lower than the end threshold score. In the example of FIG. 7, the DSP 250 determines the maximum keyword score that is calculated for a portion of the input sound stream received at time $T_M$, and then detects the end of the activation keyword at time $T_{E2}$, from which the keyword score is below the end threshold score.

Figure 8:
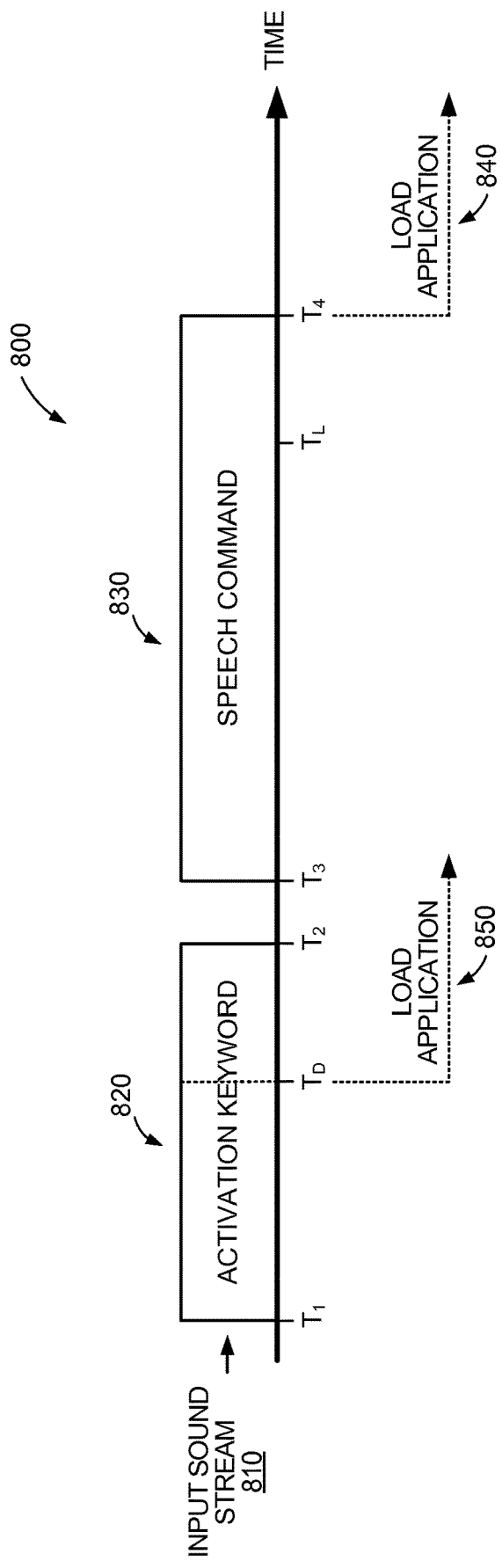
FIG. 8 is a timing diagram of activating a voice assistant application in response to verifying whether to activate the voice assistant application, according to one embodiment of the present disclosure.

FIG. 8 is a timing diagram 800 of activating the voice assistant application 262 in response to verifying whether to activate the voice assistant application 262, according to one embodiment of the present disclosure. Similar to the timing diagram 600 in FIG. 6, the electronic device 200 may receive an input sound stream 810 including an activation keyword 820 and a speech command 830. In the timing diagram 800, the activation keyword 820 in the input sound stream 810 may be received from time $T_1$ to time $T_2$. Thus, time $T_1$ and time $T_2$ may correspond to a beginning and an end, respectively, of the activation keyword 820 in the input sound stream 810. Subsequently, the speech command 830 in the input sound stream 810 may be received from time $T_3$ to time $T_4$. Thus, time $T_3$ and time $T_4$ may correspond to a beginning and an end, respectively, of the speech command 830 in the input sound stream 810.

As the sound sensor 210 receives the input sound stream 810 and provides the DSP 250 in the processor 240 with the received input sound stream, the DSP 250 may buffer a portion of the input sound stream 810, which may include at least a portion of the activation keyword 820, in the buffer unit 310 of the buffer memory 254. Further, the DSP 250 may buffer another portion of the input sound stream 810, which may include at least a portion of the speech command 830, in the buffer unit 320 of the buffer memory 254. The DSP 250 may terminate buffering the portion of the input sound stream 810 in the buffer unit 320 when the end of the speech command 830 is detected at time $T_4$. The voice activation unit 252 in the DSP 250 may then verify whether to activate the voice assistant application 262 based on the portion of the input sound stream 810 buffered in the buffer unit 320. If activation of the voice assistant application 262 is verified, the voice activation unit 252 may activate the voice assistant application 262.

In one embodiment, when the DSP 250 terminates buffering the portion of the input sound stream 810 in the buffer unit 320 at time $T_4$ and the voice activation unit 252 verifies activation of the voice assistant application 262 based on the buffered portion of the input sound stream 810 in the buffer unit 320, the voice activation unit 252 may activate the processor 240, which in turn may load the voice assistant application 262 (as indicated with an arrow 840 in FIG. 8). According to some embodiments, the voice assistant application 262 may be initially stored in the storage unit 260, e.g., a ROM, an EEPROM, or a flash memory. Also, the processor 240 may load the stored voice assistant application 262 into a temporary memory (or a working memory), e.g., a cache memory or a RAM, which may be quickly accessed by the processor 240.

Once the voice assistant application 262 is loaded, the processor 240 launches the voice assistant application 262 for recognizing the speech command 830 and performing a function of the voice assistant application 262 that is associated with the recognized speech command 830. The processor 240 may launch the voice assistant application 262 by executing one or more instructions coded in the voice assistant application 262 that is loaded in the temporary memory. Additionally, the current state of the launched voice assistant application 262 may be output by the I/O unit 220 for display to a user of the electronic device 200.

In another embodiment, the voice activation unit 252 may activate the processor 240 to start loading of the voice assistant application 262 upon detecting the activation keyword 820 at time $T_D$ (as indicated with an arrow 850 in FIG. 8). In this case, the DSP 250 may terminate buffering the portion of the input sound stream 810 in the buffer unit 320 at time $T_4$ and then verify whether to activate the loaded voice assistant application 262 based on the buffered portion of the input sound stream 810 in the buffer unit 320. If activation of the voice assistant application 262 is verified, the processor 240 may launch the voice assistant application 262 after the loading of the voice assistant application 262 is completed.

In the above embodiment, the loading of the voice assistant application 262 by the processor 240 may start upon detecting the activation keyword 820 at time $T_D$, and may be completed before the DSP 250 terminates buffering the portion of the input sound stream 810 in the buffer unit 320 at time $T_4$. For example, as shown in FIG. 8, the loading of the voice assistant application 262 may be completed at time $T_L$ before the end of the speech command 830 is detected at time $T_4$. In such a case, the loading of the voice assistant application 262 may be completed before the voice activation unit 252 verifies whether to activate the voice assistant application 262 based on the buffered portion of the input sound stream 810. Accordingly, if activation of the voice assistant application 262 is verified, the processor 240 may launch the voice assistant application 262 without waiting for the voice assistant application 262 to be loaded.

According to some embodiments, if the loading of the voice assistant application 262 by the processor 240 is completed (e.g., at time $T_L$) before the end of the speech command 830 is received, the DSP 250 may terminate buffering a portion of the input sound stream 810 in the buffer unit 320 upon completing the loading of the voice assistant application 262. After the DSP 250 terminates buffering the portion of the input sound stream 810 in the buffer unit 320, the processor 240 may start buffering another portion of the input sound stream 810 that is subsequently received from the sound sensor 210, e.g., in the storage unit 260. As a result, the portion of the input sound stream 810 buffered in the buffer unit 320 may include a first portion of the speech command 830, and the portion of the input sound stream 810 buffered in the storage unit 260 may include a second portion of the speech command 830 that follows the first portion. The portions of the input sound stream 810 buffered in the buffer unit 320 and the storage unit 260 may be used in recognizing the speech command 830 by the voice assistant application 262 for performing a function associated with the speech command 830.

When the DSP 250 terminates buffering the portion of the input sound stream 810 in the buffer unit 320, the voice activation unit 252 may verify whether to activate the voice assistant application 262 based on the portion of the input sound stream 810 buffered in the buffer unit 320 that includes the first portion of the speech command 830. If activation of the voice assistant application 262 is verified, the processor 240 may launch the voice assistant application 262, which may access the both portions of the input sound stream 810 buffered in the buffer unit 320 and the storage unit 260. Additionally or alternatively, the portion of the input sound stream 810 buffered in the buffer unit 320 may be transmitted or copied to the storage unit 260, such that the voice assistant application 262 can access the first and second portions of the speech command 830 from the storage unit 260.

Figure 9:
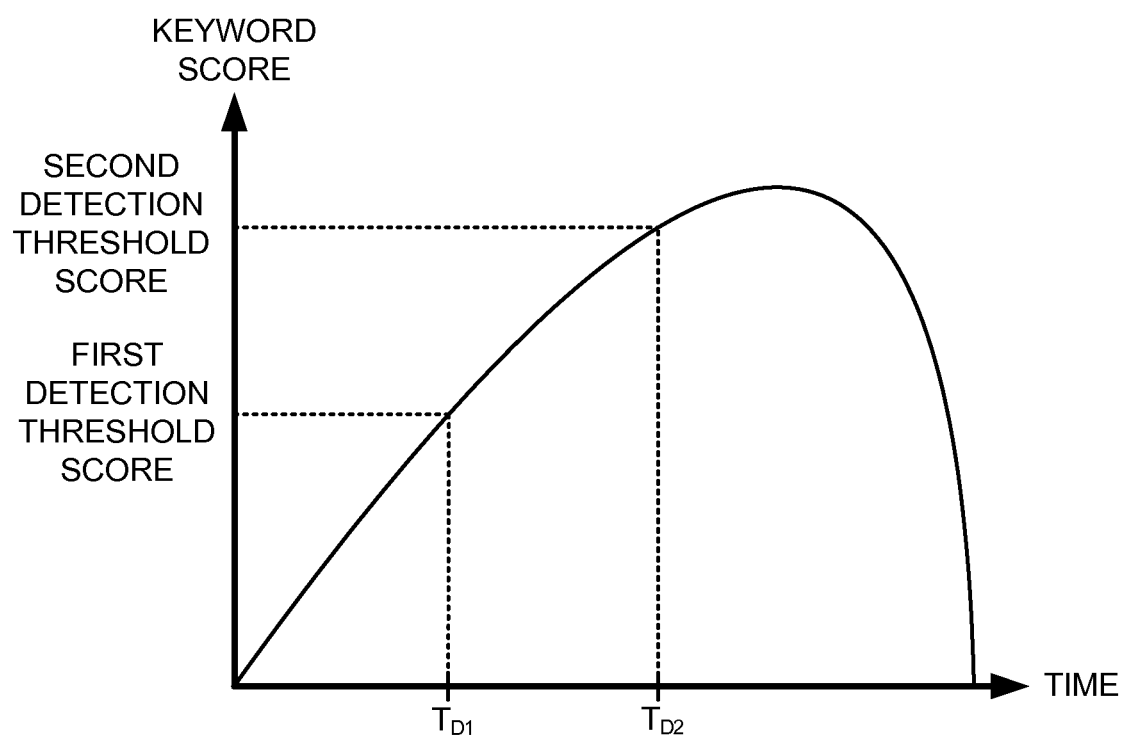
FIG. 9 is a graph illustrating change in a keyword score of an input sound stream that is determined for loading a voice assistant application based on a first detection threshold score and verifying the loading of the voice assistant application 262 based on a second detection threshold score, according to one embodiment of the present disclosure.

FIG. 9 is a graph illustrating change in a keyword score of an input sound stream that is determined for loading the voice assistant application 262 based on a first detection threshold score and verifying the loading of the voice assistant application 262 based on a second detection threshold score, according to one embodiment of the present disclosure. The input sound stream may be received by the sound sensor 210 in the electronic device 200 and provided to the DSP 250, which may buffer a portion of the input sound stream received from the sound sensor 210 in the buffer unit 310 of the buffer memory 254. The buffered portion of the input sound stream in the buffer unit 310 may include at least a portion of an activation keyword. The keyword detection unit 410 in the voice activation unit 252 of the DSP 250 may extract a plurality of sound features from the buffered portion of the input sound stream and determine a plurality of keyword scores for the plurality of sound features.

In the illustrated embodiment, the keyword detection unit 410 may be configured to compare each of the keyword scores with the first detection threshold score. The first detection threshold score may indicate a keyword score for ensuring detection of the activation keyword that is included in the buffered portion of the input sound stream, with a relatively low confidence. If one of the plurality of keyword scores (e.g., determined for a portion of the input sound stream received at time $T_{D1}$ in FIG. 9) is determined to exceed the first detection threshold score, it may be inferred with the relatively low confidence that the activation keyword is detected from the input sound stream. Upon detection of the activation keyword, the keyword detection unit 410 may activate the processor 240 to start loading the voice assistant application 262 from the storage unit 260 into a temporary memory (or a working memory) which may be quickly accessed by the processor 240.

While the voice assistant application 262 is being loaded, the DSP 250 may continue to receive the input sound stream from the sound sensor 210 and buffer a portion of the input sound stream, which may include at least a portion of the activation keyword, in the buffer unit 310. The keyword detection unit 410 may verify the loading of the voice assistant application 262 based on the portion of the input sound stream that is buffered in the buffer unit 310 while the voice assistant application 262 is being loaded. For example, the keyword detection unit 410 may determine a plurality of keyword scores for the buffered portion of the input sound stream and compare each of the plurality of keyword scores with the second detection threshold score. The second detection threshold score may indicate a keyword score for ensuring detection of the activation keyword that is included in the input sound stream, with a relatively high confidence. Accordingly, the second detection threshold score may be set to be greater than the first detection threshold score as illustrated in the graph of FIG. 9.

If one of the plurality of keyword scores is determined to exceed the second detection threshold score (e.g., at time $T_{D2}$ in FIG. 9), it may be inferred with the relatively high confidence that the activation keyword is detected from the input sound stream, and the loading of the voice assistant application 262 may be verified. In this case, the keyword detection unit 410 may instruct the processor 240 to continue the loading of the voice assistant application 262. Subsequently, the DSP 250 may continue to receive the input sound stream from the sound sensor 210 and buffer a portion of the input sound stream, which may include at least a portion of a speech command, in the buffer unit 320 of the buffer memory 254. The verification unit 420 in the voice activation unit 252 may then verify whether to activate the voice assistant application 262 based on the portion of the input sound stream buffered in the buffer unit 320 for launching the voice assistant application 262 in the manner as described above with respect to FIG. 8. On the other hand, if none of the plurality of keyword scores is determined to exceed the second detection threshold score, it may be inferred that the input sound stream does not include the activation keyword. In this case, the electronic device 200 may proceed to receive a next input sound stream for detecting the activation keyword without launching the voice assistant application 262.

Figure 10:
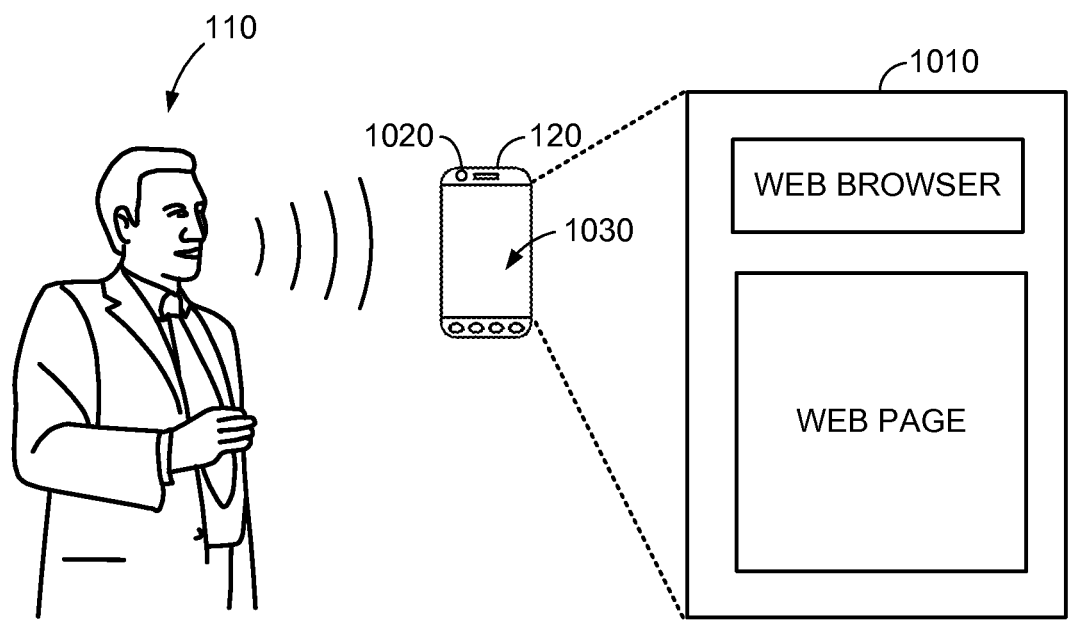
FIG. 10 illustrates a mobile device that activates a web browser application in response to detecting an activation keyword in an input sound stream, according to one embodiment of the present disclosure.

In some embodiments, when a user speaks an activation keyword for activating a target application of an electronic device, the electronic device may verify whether to activate the target application based on environmental information generated by one or more context sensors in the electronic device. FIG. 10 illustrates the mobile device 120 that activates a web browser application 1010 in response to detecting an activation keyword in an input sound stream, according to one embodiment of the present disclosure. Similar to the embodiment of FIG. 1, the mobile device 120 may pre-store an activation keyword for activating the web browser application 1010 in the mobile device 120. In the illustrated embodiment, when the user 110 speaks an activation keyword such as "START BROWSER" to the mobile device 120, the mobile device 120 may capture an input sound stream and detect the activation keyword in the input sound stream.

The mobile device 120 may include one or more context sensors each configured to generate sensor data indicative of a context of the mobile device 120. As used herein, the term "context" of an electronic device may refer to an environment where the device is located, such as a street, an office, a vehicle, a restaurant, a transportation facility, and the like. The term "context" may also refer to activities or situations in which the device or its user is involved, such as being in a dark environment, sleeping at home, watching a TV program, listening to music, playing soccer in a playground, and the like. For example, the one or more context sensors may include an image sensor 1020 such as a camera that is mounted on a surface of the mobile device 120 that includes a display screen 1030, as shown in FIG. 10. The image sensor 1020 may be configured to generate sensor data by capturing an input image. For example, when the user 110 views the display screen 1030, the captured input image may include a portion of a face of the user 110 (e.g., eyes of the user 110). In some embodiments, upon detecting the activation keyword, the image sensor 1020 may capture an input image and the mobile device 120 may buffer the captured input image as sensor data in a memory unit.

When the activation keyword for activating the web browser application 1010 is detected from the input sound stream, the mobile device 120 may verify whether to activate the web browser application 1010 based on the sensor data generated by the image sensor 1020. For example, the mobile device 120 may verify whether to activate the web browser application 1010 by determining whether the input image captured by the image sensor 1020 includes at least one eye of a person (e.g., the user 110). If it is determined that the input image includes at least one eye of a person, the mobile device 120 verifies activation of the web browser application 1010 and activates the web browser application 1010. Once activated, the web browser application 1010 may be displayed on the display screen 1030 so that the user 110 may view a web page displayed by the web browser application 1010. On the other hand, if it is determined that the input image does not include any eyes of a person, activation of the web browser application 1010 is not verified and the mobile device 120 may proceed to receive a next input sound stream for detecting the activation keyword.

Figure 11:
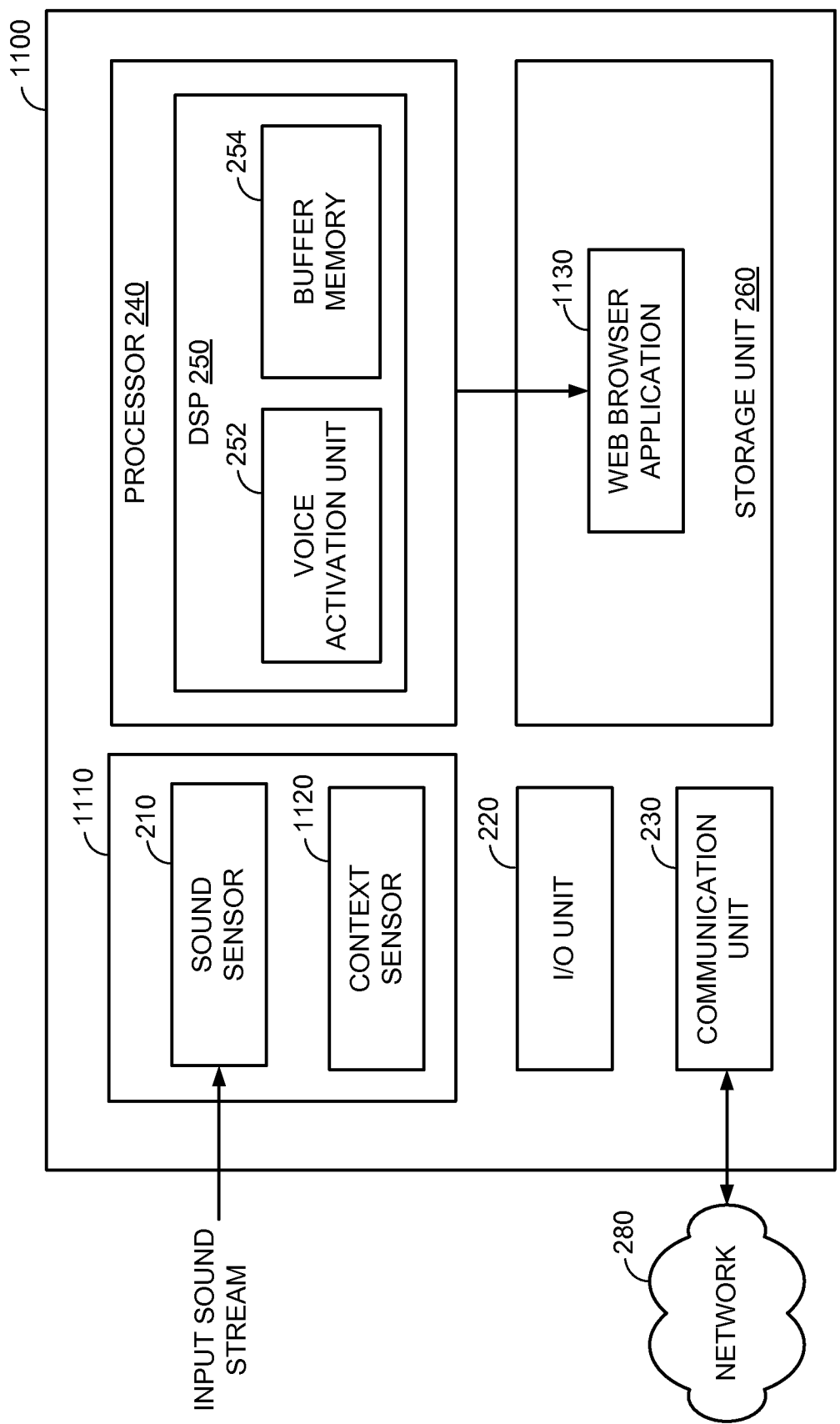
FIG. 11 illustrates a block diagram of an electronic device configured to activate a web browser application based on sensor data generated by a verification sensor in the electronic device, according to one embodiment of the present disclosure.

FIG. 11 illustrates a block diagram of an electronic device 1100 configured to activate a web browser application 1130 based on sensor data generated by a context sensor 1120 in the electronic device 1100, according to one embodiment of the present disclosure. The electronic device 1100 may include a sensor unit 1110, the I/O unit 220, the communication unit 230, the processor 240, and the storage unit 260. The sensor unit 1110 may include the sound sensor 210 and the context sensor 1120. The processor 240 may include the DSP 250 which may include the voice activation unit 252 and the buffer memory 254. In the illustrated embodiment, the sound sensor 210, the I/O unit 220, the communication unit 230, the processor 240, the DSP 250, the voice activation unit 252, the buffer memory 254, and the storage unit 260 may have a similar configuration or function to those included in the electronic device 200 of FIG. 2. In addition, the electronic device 1100 may be any suitable device equipped with sound capturing and processing capabilities such as a cellular phone, a smartphone (e.g., the mobile device 120), a personal computer, a laptop computer, a tablet computer, a smart television, a gaming device, a multimedia player, smart glasses, a wearable computer, etc.

The sound sensor 210 may receive an input sound stream and provide the received input sound stream to the DSP 250. As the input sound stream is received from the sound sensor 210, the voice activation unit 252 in the DSP 250 may detect an activation keyword (e.g., "START BROWSER") for activating the web browser application 1130 from the received input sound stream. For detecting the activation keyword, the voice activation unit 252 may employ any suitable keyword detection methods based on a Markov chain model such as an HMM, an SMM, or a combination thereof.

In one embodiment, the storage unit 260 may store any suitable information and/or data for keyword detection such as state information for a plurality of states of the activation keyword under a Markov chain model such as an HMM, an SMM, or the like. The storage unit 260 may also store the web browser application 1130 that can be accessed by the processor 240. Although the storage unit 260 stores the web browser application 1130 in the illustrated embodiment, it may also store any other applications or functions of the electronic device 1100 such as a camera application, a memo application, a calendar application, a music player application, and the like.

The context sensor 1120 in the sensor unit 1110 may include one or more sensors each configured to generate sensor data indicative of a context of the electronic device 1100. For example, the context sensor 1120 may include a camera sensor which is configured to capture an input image as sensor data. The camera sensor may be mounted on a surface of the electronic device 1100 that includes a display screen of the I/O unit 220, such that the camera sensor may capture an image including one or two eyes of a person (e.g., the user 110) facing the display screen. Additionally or alternatively, the context sensor 1120 may include any other suitable sensors such as an illumination sensor, a proximity sensor, a location sensor (e.g., a global positioning system (GPS)), an accelerometer, a motion sensor, a contact sensor, and the like. In some embodiments, the sound sensor 210 may be further configured to generate sensor data indicative of a context of the electronic device 1100 by capturing environmental sound.

Upon detecting the activation keyword, the context sensor 1120 may provide the sensor data to the DSP 250, which may buffer the sensor data in the buffer memory 254. The voice activation unit 252 may verify whether to activate the web browser application 1130 based on the buffered sensor data. For example, the DSP 250 may receive the input image as sensor data from the camera sensor of the context sensor 1120. Further, the voice activation unit 252 may verify whether to activate the web browser application 1130 based on the input image.

In one embodiment, the voice activation unit 252 may verify whether to activate the web browser application 1130 by determining whether the input image includes at least one eye of a person. If it is determined that the input image includes at least one eye of a person, the voice activation unit 252 may activate the processor 240 which in turn may activate the web browser application 1130. On the other hand, if it is determined that the input image does not include any eyes of a person, activation of the web browser application 1130 is not verified and the electronic device 1100 may proceed to receive a next input sound stream for detecting the activation keyword.

In some embodiments, the operations of buffering the sensor data in the buffer memory 254 and activating the web browser application 1130 may be performed in similar manners as described above with reference to FIGS. 6 and 8. In addition, although the electronic device 1100 activates the web browser application 1130 by verifying activation of the web browser application 1130 based on sensor data such as an input image captured by a camera sensor, the electronic device 1100 may also be configured to activate any other suitable applications by verifying whether to activate the applications based on sensor data generated from any other suitable context sensors. In one embodiment, the electronic device 1100 may activate a camera application when activation of the camera application is verified based on sensor data from an illumination sensor in the context sensor 1120. For example, the voice activation unit 252 may verify activation of the camera application when the sensor data from the illumination sensor indicates that the environment of the electronic device 1100 is bright enough to be visible. If activation of the camera application is verified, the voice activation unit 252 may activate the processor 240 to active the camera application.

Figure 12:
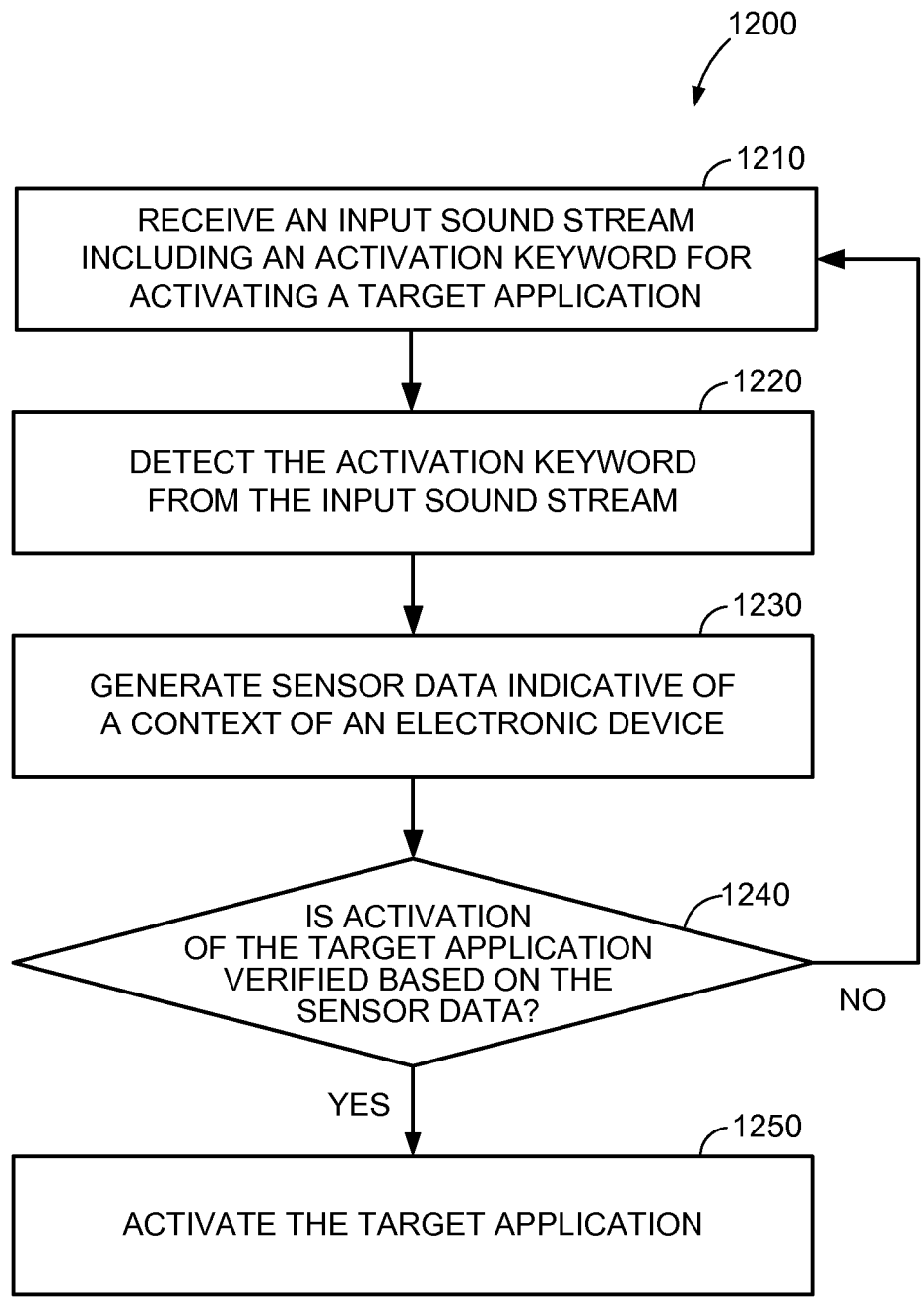
FIG. 12 illustrates a flowchart of a method for activating a target application by detecting an activation keyword and verifying whether to activate the target application based on sensor data indicative of a context of an electronic device, according to one embodiment of the present disclosure.

FIG. 12 illustrates a flowchart of a method 1200 for activating a target application by detecting an activation keyword and verifying whether to activate the target application based on sensor data indicative of a context of the electronic device 1100, according to one embodiment of the present disclosure. The electronic device 1100 may receive an input sound stream including the activation keyword for activating the target application, at 1210. For example, the activation keyword may be "START BROWSER" and the target application may be the web browser application 1130 as described above with reference to FIG. 11.

In one embodiment, a portion of the received input sound stream including at least a portion of the activation keyword may be buffered in the buffer memory 254 in the DSP 250. The voice activation unit 252 in the DSP 250 may detect the activation keyword from the portion of the input sound stream buffered in the buffer memory 254, at 1220. If the activation keyword is detected, one or more context sensors in the electronic device 1100 may generate the sensor data indicative of the context of the electronic device 1100, at 1230. The generated sensor data may be buffered in the buffer memory 254.

The voice activation unit 252 may verify whether to activate the target application based on the sensor data, at 1240. If the voice activation unit 252 verifies activation of the target application (i.e., "YES" at 1240), the voice activation unit 252 may activate the target application, at 1250. On the hand, activation of the target application is not verified (i.e., "NO" at 1240), the method 1200 proceeds to 1210 so that the electronic device 1100 may receive a next input sound stream for detecting an activation keyword.

Figure 13:
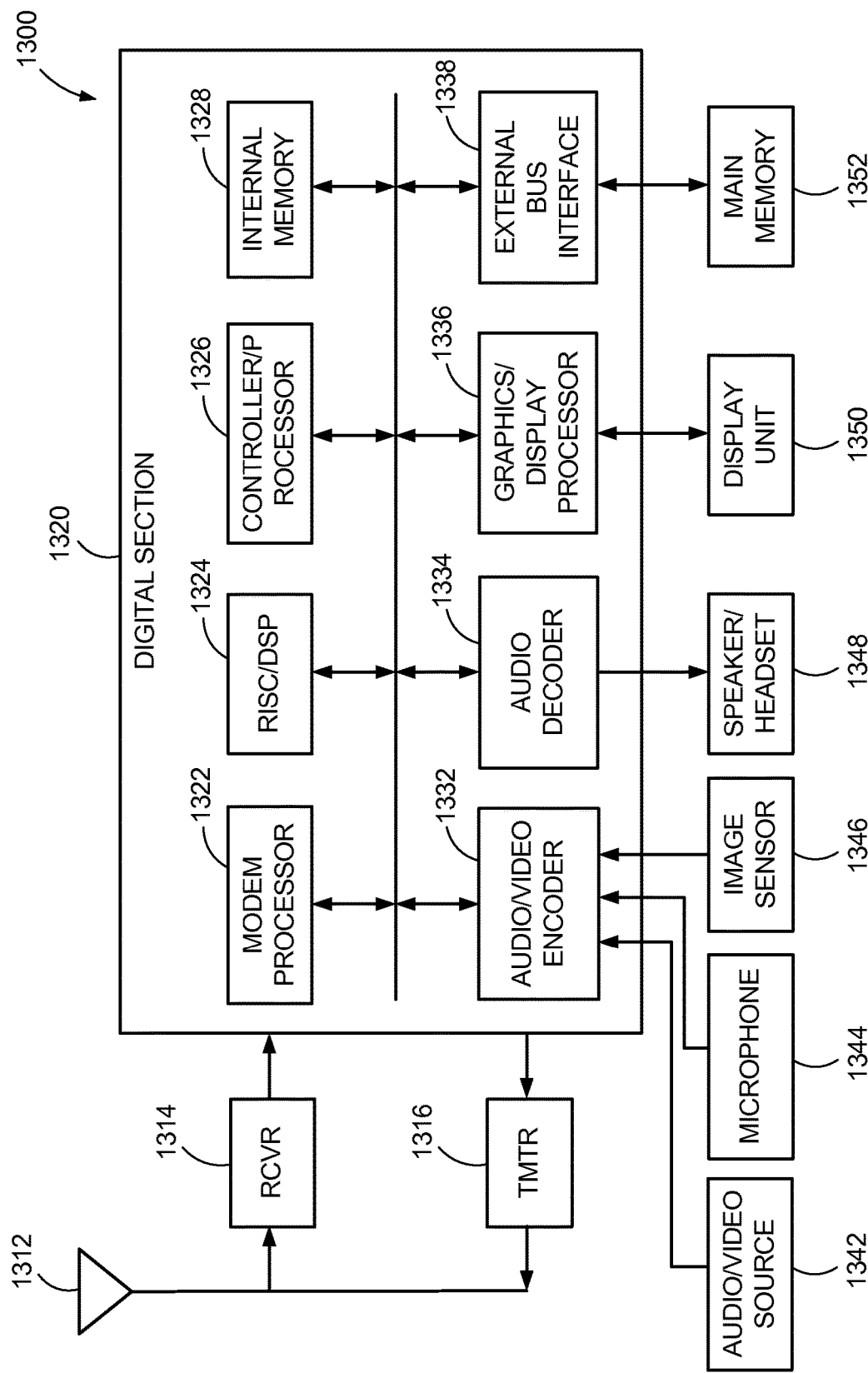
FIG. 13 is a block diagram of an exemplary electronic device in which methods and apparatus for activating a target application upon detecting an activation keyword are implemented according to some embodiments of the present disclosure.

FIG. 13 is a block diagram of an exemplary electronic device 1300 in which the methods and apparatus for activating a target application upon detecting an activation keyword may be implemented according to some embodiments of the present disclosure. The configuration of the electronic device 1300 may be implemented in the electronic devices according to the above embodiments described with reference to FIGS. 1 to 12. The electronic device 1300 may be a cellular phone, a smartphone, a tablet computer, a laptop computer, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Term Evolution (LTE) system, LTE Advanced system, etc. Further, the electronic device 1300 may communicate directly with another mobile device, e.g., using Wi-Fi Direct or Bluetooth.

The electronic device 1300 is capable of providing bidirectional communication via a receive path and a transmit path. On the receive path, signals transmitted by base stations are received by an antenna 1312 and are provided to a receiver (RCVR) 1314. The receiver 1314 conditions and digitizes the received signal and provides samples such as the conditioned and digitized digital signal to a digital section for further processing. On the transmit path, a transmitter (TMTR) 1316 receives data to be transmitted from a digital section 1320, processes and conditions the data, and generates a modulated signal, which is transmitted via the antenna 1312 to the base stations. The receiver 1314 and the transmitter 1316 may be part of a transceiver that may support CDMA, GSM, LTE, LTE Advanced, etc.

The digital section 1320 includes various processing, interface, and memory units such as, for example, a modem processor 1322, a reduced instruction set computer/digital signal processor (RISC/DSP) 1324, a controller/processor 1326, an internal memory 1328, a generalized audio/video encoder 1332, a generalized audio decoder 1334, a graphics/display processor 1336, and an external bus interface (EBI) 1338. The modem processor 1322 may perform processing for data transmission and reception, e.g., encoding, modulation, demodulation, and decoding. The RISC/DSP 1324 may perform general and specialized processing for the electronic device 1300. The controller/processor 1326 may perform the operation of various processing and interface units within the digital section 1320. The internal memory 1328 may store data and/or instructions for various units within the digital section 1320.

The generalized audio/video encoder 1332 may perform encoding for input signals from an audio/video source 1342, a microphone 1344, an image sensor 1346, etc. The generalized audio decoder 1334 may perform decoding for coded audio data and may provide output signals to a speaker/headset 1348. The graphics/display processor 1336 may perform processing for graphics, videos, images, and texts, which may be presented to a display unit 1350. The EBI 1338 may facilitate transfer of data between the digital section 1320 and a main memory 1352.

The digital section 1320 may be implemented with one or more processors, DSPs, microprocessors, RISCs, etc. The digital section 1320 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for processing input sound, the method comprising: receiving, at an electronic device, an input sound stream including an activation keyword for activating a target application and a speech command portion that follows the activation keyword;
   detecting, at the electronic device, the activation keyword from the input sound stream;
   based on the detecting of an activation keyword, processing the speech command portion to determine whether to activate the target application;
   generating sensor data indicative of an environment where the device is located using one or more context sensors in the electronic device; and
   selectively activating the target application based on the processing of the speech command and the sensor data.

2. The method of claim 1, wherein determining whether to activate the target application is based on sound characteristics of the speech command portion.

3. The method of claim 1, wherein processing the speech command portion to determine whether to activate the target application includes:
   extracting sound characteristics of speech in the speech command portion; and
   comparing the extracted sound characteristics to sound characteristics indicative of a particular speaker.

4. The method of claim 3, wherein processing the speech command portion to determine whether to activate the target application further includes determining not to activate the target application responsive to the comparison indicating that the speech in the speech command portion is not indicative of the particular speaker.

5. The method of claim 1, further comprising initiating loading of the target application from a storage unit responsive to detecting the activation keyword and prior to determining not to activate the target application.

6. The method of claim 1, further comprising:
   responsive to determining, based on the processing of the speech command portion, that the target application is not to be activated, detecting the activation keyword from a second input sound stream that further includes a second speech command portion;
   processing the second speech command portion to determine whether to activate the target application; and
   activating the target application based on the processing of the second speech command portion.

7. The method of claim 1, further comprising activating a processor in response to determining to activate the target application, wherein the target application is selectively activated by the processor.

8. The method of claim 1, wherein the sensor data comprises data from a contact sensor.

9. The method of claim 1, wherein the sensor data comprises data from an accelerometer or motion sensor.

10. The method of claim 1, wherein the sensor data comprises data from a location sensor.

11. The method of claim 1, wherein the sensor data comprises data from an illumination sensor.

12. An apparatus comprising: a memory; and
    one or more processors coupled to the memory, the one or more processors configured to: receive an input sound stream including an activation keyword for activating a target application and a speech command portion that follows the activation keyword;
    detect the activation keyword from the input sound stream;
    process the speech command portion to determine whether to activate the target application;

generate sensor data indicative of an environment where the device is located using one or more context sensors in the apparatus; and selectively activate the target application based on the processing of the speech command and the sensor data.

13. The apparatus of claim 12, wherein the determination of whether to activate the target application is based on sound characteristics of the speech command portion.

14. The apparatus of claim 12, wherein the one or more processors are further configured to:
extract sound characteristics of speech in the speech command portion; and
compare the extracted sound characteristics to sound characteristics indicative of a particular speaker.

15. The apparatus of claim 14, wherein the one or more processors are configured to not activate the target application responsive to the comparison indicating that the speech in the speech command portion is not indicative of the particular speaker.

16. The apparatus of claim 12, wherein the one or more processors are further configured to initiate loading of the target application from a storage unit responsive to detection of the activation keyword and prior to a determination not to activate the target application.

17. The apparatus of claim 12, wherein the one or more processors are configured to perform input sound stream processing to detect another occurrence of the activation keyword in response to a determination that the target application is not to be activated.

18. The apparatus of claim 12, wherein the memory and the one or more processors are integrated into a mobile device.

19. The apparatus of claim 12, wherein the sensor data comprises data from a contact sensor.

20. The apparatus of claim 12, wherein the sensor data comprises data from an accelerometer or motion sensor.

21. The apparatus of claim 12, wherein the sensor data comprises data from a location sensor.

22. The apparatus of claim 12, wherein the sensor data comprises data from an illumination sensor.

23. A method for processing input sound, the method comprising:
receiving, at an electronic device, a first input sound stream including an activation keyword for activating a target application and a first speech command portion that follows the activation keyword;
detecting, at the electronic device, the activation keyword from the first input sound stream;
processing the first speech command portion to determine whether to activate the target application;
generating sensor data indicative of an environment where the device is located using one or more context sensors;
responsive to determining, based on the processing of the first speech command portion, that the target application is not to be activated, detecting the activation keyword from a second input sound stream that further includes a second speech command portion;
processing the second speech command portion to determine whether to activate the target application; and
activating the target application based on the processing of the second speech command portion and the sensor data.

24. The method of claim 23, wherein determining whether to activate the target application is based on sound characteristics of the first speech command portion.

25. The method of claim 23, wherein processing the first speech command portion to determine whether to activate the target application includes:
extracting sound characteristics of speech in the first speech command portion; and
comparing the extracted sound characteristics to sound characteristics indicative of a particular speaker.

26. The method of claim 25, wherein processing the speech command portion to determine whether to activate the target application further includes determining not to activate the target application responsive to the comparison indicating that the speech in the speech command portion is not indicative of the particular speaker.

27. The method of claim 23, further comprising initiating loading of the target application from a storage unit responsive to detecting the activation keyword and prior to determining not to activate the target application.

28. The method of claim 23, wherein the electronic device comprises a mobile device.

29. The method of claim 23, wherein the sensor data comprises data from a contact sensor.

30. The method of claim 23, wherein the sensor data comprises data from an accelerometer or motion sensor.

31. The method of claim 23, wherein the sensor data comprises data from a location sensor.

32. The method of claim 23, wherein the sensor data comprises data from an illumination sensor.

33. An apparatus comprising:
a memory; and
one or more processors coupled to the memory, the one or more processors configured to: receive a first input sound stream including an activation keyword for activating a target application and a first speech command portion that follows the activation keyword;
detect the activation keyword from the first input sound stream; process the first speech command portion to determine whether to activate the target application;
generating sensor data indicative of an environment where the device is located using one or more context sensors in the electronic device; and
responsive to a determination, based on the processing of the first speech command portion, that the target application is not to be activated, detect the activation keyword from a second input sound stream that further includes a second speech command portion;
process the second speech command portion to determine whether to activate the target application; and
activate the target application based on the processing of the second speech command portion and the sensor data.

34. The apparatus of claim 33, further comprising:
a decoder coupled to the one or more processors, the decoder configured to decode an encoded audio signal.

35. The apparatus of claim 33, wherein the determination of whether to activate the target application is based on sound characteristics of the first speech command portion.

36. The apparatus of claim 33, wherein the one or more processors are further configured to:
extract sound characteristics of speech in the first speech command portion; and
compare the extracted sound characteristics to sound characteristics indicative of a particular speaker.

37. The apparatus of claim 36, wherein the one or more processors are configured to determine not to activate the target application responsive to the comparison indicating that the speech in the first speech command portion is not indicative of the particular speaker.

38. The apparatus of claim 33, wherein the one or more processors are further configured to initiate loading of the target application from a storage unit responsive to detection of the activation keyword and prior to a determination not to activate the target application.

39. The apparatus of claim 33, further comprising:
an antenna; and
a receiver coupled to the antenna and configured to receive an encoded audio signal.

40. The apparatus of claim 39, further comprising a demodulator coupled to the receiver, the demodulator configured to demodulate the encoded audio signal.

41. The apparatus of claim 33, wherein the memory and the one or more processors are integrated into a mobile device.

42. The apparatus of claim 33, further comprising a transmitter coupled to the one or more processors.

43. The apparatus of claim 33, wherein the sensor data comprises data from a contact sensor.

\* \* \* \* \*